United States Patent
Casado et al.

(10) Patent No.: US 11,416,007 B2
(45) Date of Patent: Aug. 16, 2022

(54) COMPUTER-IMPLEMENTED METHOD AND SYSTEM FOR EVALUATING UNCERTAINTY IN TRAJECTORY PREDICTION

(71) Applicant: The Boeing Company, Chicago, IL (US)

(72) Inventors: Enrique Casado, Pinto (ES); Miguel Vilaplana, Madrid (ES); Marco La Civita, Madrid (ES)

(73) Assignee: The Boeing Company, Chicago, IL (US)

( * ) Notice: Subject to any disclaimer, the term of this patent is extended or adjusted under 35 U.S.C. 154(b) by 370 days.

(21) Appl. No.: 16/537,182

(22) Filed: Aug. 9, 2019

(65) Prior Publication Data
US 2020/0050218 A1 Feb. 13, 2020

(30) Foreign Application Priority Data
Aug. 10, 2018 (EP) .................................. 18382606

(51) Int. Cl.
| | |
|---|---|
| *G05D 1/10* | (2006.01) |
| *G06F 17/12* | (2006.01) |
| *G06N 7/00* | (2006.01) |
| *G08G 5/00* | (2006.01) |

(52) U.S. Cl.
CPC ............ *G05D 1/101* (2013.01); *G06F 17/12* (2013.01); *G06N 7/005* (2013.01); *G08G 5/003* (2013.01); *G08G 5/0004* (2013.01)

(58) Field of Classification Search
CPC ........ G05D 1/101; G06F 17/12; G06N 7/005; G08G 5/0004; G08G 5/003; G08G 5/0095; G08G 5/0043
See application file for complete search history.

(56) References Cited

U.S. PATENT DOCUMENTS
2005/0004833 A1 1/2005 McRae et al.

FOREIGN PATENT DOCUMENTS
| | | |
|---|---|---|
| EP | 2040137 A1 | 3/2009 |
| EP | 2482269 A1 | 8/2012 |

(Continued)

OTHER PUBLICATIONS

Casado, et al., Quantification of trajectory prediction uncertainty, COPTRA, H2020-SESAR-2015-1, Sesar-09-2015, Feb. 7, 2017 (Year: 2017).*

(Continued)

*Primary Examiner* — Yuen Wong
(74) *Attorney, Agent, or Firm* — Sage Patent Group

(57) ABSTRACT

A system and a computer-implemented method for evaluating uncertainty of a predicted trajectory infrastructure is disclosed The method comprises collecting a plurality of data sets from a predicted trajectory: comprising providing an aircraft intent description based on the predicted trajectory; selecting both a point in time and one or more variables among the collected plurality of data sets as sources of uncertainty; representing each selected variable at the selected point in time as a uni-variable polynomial expansion; representing each non-selected variable by a single point; and combining selected and non-selected variables into a multi-variable polynomial chaos expansion representing a stochastic prediction of the aircraft's trajectory at the selected point in time and a measurement of a sensitivity of the prediction to each of the selected one or more sources of uncertainty.

20 Claims, 2 Drawing Sheets

(56) References Cited

FOREIGN PATENT DOCUMENTS

| EP | 2685440 A1 | 1/2014 |
|----|------------|--------|
| EP | 2801963 A1 | 11/2014 |
| EP | 2889579 A1 | 7/2015 |

OTHER PUBLICATIONS

Cortesi, Predictive numerical simulations for rebuilding freestream conditions in atmospheric entry flows, PhD thesis, University de Bordeaux, submitted Apr. 12, 2018 (Year: 2018).*
European Office Action dated Oct. 22, 2020 for European Patent Application No. 18382606.4, 7 pages.
Casado, Enrique et al., "Quantification of Aircraft Trajectory Prediction Uncertainty using Polynomial Chaos Expansions," 2017 IEEE/AIAA 36th Digital Avionics Systems Conference (DASC), Sep. 17, 2017, 11 pages.
Casado, Enrique et al., "Estimated Time of Arrival Sensitivity to Aircraft Intent Uncertainty," IFAC PapersOnLine, vol. 51, No. 9, Jan. 1, 2018, pp. 162-167.
European Summons to Attend Oral Proceedings dated Jun. 22, 2021 for European Patent Application No. 18382606.4, 11 pages.
European Office Action dated Feb. 25, 2021 for European Patent Application No. 15382435.4, 9 pages.
López-Leonés, Javier et al., "The Aircraft Intent Description Language: a Key Enabler for Air-Ground Synchronization in Trajectory-Based Operations," Digital Avionics Systems Conference (DASC '07), IEEE, Oct. 2007, 12 pages.

* cited by examiner

COMPUTER-IMPLEMENTED METHOD AND SYSTEM FOR EVALUATING UNCERTAINTY IN TRAJECTORY PREDICTION

CROSS-REFERENCE TO RELATED APPLICATIONS

The present application claims benefit of priority to European Patent Application No. 18382606.4, filed Aug. 10, 2018, and assigned to the same assignee as the present application and is incorporated herein by reference.

FIELD

The present disclosure is related to Air Traffic Management (ATM). In particular, the present disclosure relates to techniques for analytically quantifying the propagation of the uncertainty associated with aircraft trajectory prediction.

BACKGROUND

Trajectory prediction techniques are at the core of some applications and decision support tools (DSTs) in current and future ATM environments.

Currently, the prediction techniques are essentially deterministic. That is, the same trajectory prediction is returned based on the same set of inputs.

However, in reality, trajectory prediction is subject to stochastic processes based on several uncertainty sources that may affect the final trajectory prediction.

At present, the most common approach to deal with quantification of uncertainty sources in the context of aircraft trajectory prediction is based on Monte Carlo simulations. This approach computes thousands of predictions and aggregates the outputs. The probability distribution of the outputs provides a representation of the uncertainty.

A Monte Carlo simulation is a highly computationally demanding process and provides results slowly. Sensitivity analyses require defining new Monte Carlo simulations in which the uncertainty sources are studied individually by removing the stochastic behavior of all sources but the one source that is under study.

In real ATM operations, implementing this approach becomes ineffective and even unfeasible. It cannot generate useful outcomes within the typical look-ahead times.

In addition, the current ATM approach of surveillance-based airspace-driven paradigm is shifting worldwide to a trajectory-based network-centric one, in which advanced Decision Support Tools (DSTs) will assist humans along the Collaborative Decision Making (CDM) process.

Therefore, there is a current need in the state of the art to better characterize how an uncertainty source propagates throughout a predicted trajectory to enable advanced ATM capabilities. A more reliable and efficient characterization of such prediction uncertainties would benefit DSTs and Air Traffic Controllers (ATCs) to provide enhanced and timely information to deal with air traffic.

SUMMARY

According to the identified shortcomings, it would be desirable to develop techniques that address at least some of the issues discussed above. In particular, providing a faster mechanism to quantify how uncertainty spreads into predicted trajectories. Thus, enabling a sensitivity assessment capability in trajectory prediction without substantial extra computational effort. A better understanding of uncertainty may increase the ATM system capacity and efficiency.

A trajectory prediction is considered as a forecast of the aircraft trajectory represented by a chronologically ordered sequence of aircraft states. A trajectory can be defined as the time evolution of the aircraft state, represented by the position of the aircraft's center of mass with respect to a known system of reference and other relevant state variables such as airspeed or aircraft mass.

To compute a prediction, it is required to define a mathematical model of the aircraft motion. This model-based approach requires additional information to return a trajectory prediction, including: (a) weather information that includes wind forecast and atmosphere conditions (temperature and pressure); (b) aircraft performance data that provide information regarding the drag, thrust and fuel consumption for the considered aircraft at the specified flight conditions; and (c) aircraft intent information that represents the command and control inputs issued by the pilot or by a Flight Management System (FMS) to steer the aircraft according to a filed Flight Plan (FP).

The assumptions of such kind of model-based trajectory prediction approaches, and the stochastic nature of the phenomena involved in the prediction process, bring deviations between the actual and predicted trajectories. The actual trajectories, denoted as epistemic uncertainty, represent imperfections or lack of knowledge regarding the considered aircraft motion model. The predicted trajectories, denoted as variability uncertainty, represent the propagation of the inputs randomness into the outputs. Thus, although high fidelity models can be used to constrain the epistemic uncertainty, the intrinsic stochastic (e.g. random) behavior of the inputs to the model leads to unavoidable prediction uncertainties, represented by the time evolution of the aircraft state variable randomness.

Trajectory prediction uncertainty can be described as the estimated amount, or percentage, by which a predicted trajectory may potentially differ from the actual trajectory.

It is noted that trajectory uncertainty cannot be obtained by comparing predictions with actual trajectories because it represents an a priori estimation of such probable deviations based on the knowledge and quantification of the sources of uncertainty impacting the prediction.

The present disclosure makes use of uni-variable polynomial chaos expansions, which describe the distributions of each input at a given point in time (e.g., latitude, longitude, altitude, time, bearing, mass, etc). With these uni-variable polynomial expansions, multi-variable polynomial chaos expansions can be constructed representing a mathematical quantification of the trajectory prediction uncertainties.

For example, a weather forecast is typically a source of uncertainty that greatly influences trajectory predictions. Other sources could be the initial aircraft mass and/or the departure time. Thus, it may be advantageous to estimate the relative contribution of each source of uncertainty to the overall uncertainty.

The capability of analytically quantifying the propagation of the uncertainty associated with an aircraft trajectory prediction in the context of ATM operations for any current or future Trajectory Prediction Infrastructure (TPI) without requiring any modification of the native implementation of the prediction capabilities would be a valuable asset.

The present disclosure provides the teachings to compute the prediction uncertainty to any deterministic TPI with the benefit of very low extra computational requirements and development costs. The present disclosure promotes its application into real-life environments and implies an improvement in contrast with other uncertainty quantification approaches in dynamic models based on Monte Carlo simulations. The proposed approach does not require any modification of current ATM implementations; thus the ATM community may use the present teachings in current and future traffic management processes, providing a reliable, accurate and robust method to deal with uncertainty.

The features and functions can be achieved independently in various embodiments of the present disclosure or may be combined in yet other embodiments in which further details can be seen with reference to the following description and drawings.

BRIEF DESCRIPTION OF THE DRAWINGS

A series of drawings which aid in better understanding the disclosure and which are presented as non-limiting examples and are very briefly described below.

DETAILED DESCRIPTION

The proposed techniques disclosed herein may enable developing a solution to the quantification of uncertainty with aircraft trajectory prediction.

Figure 1:
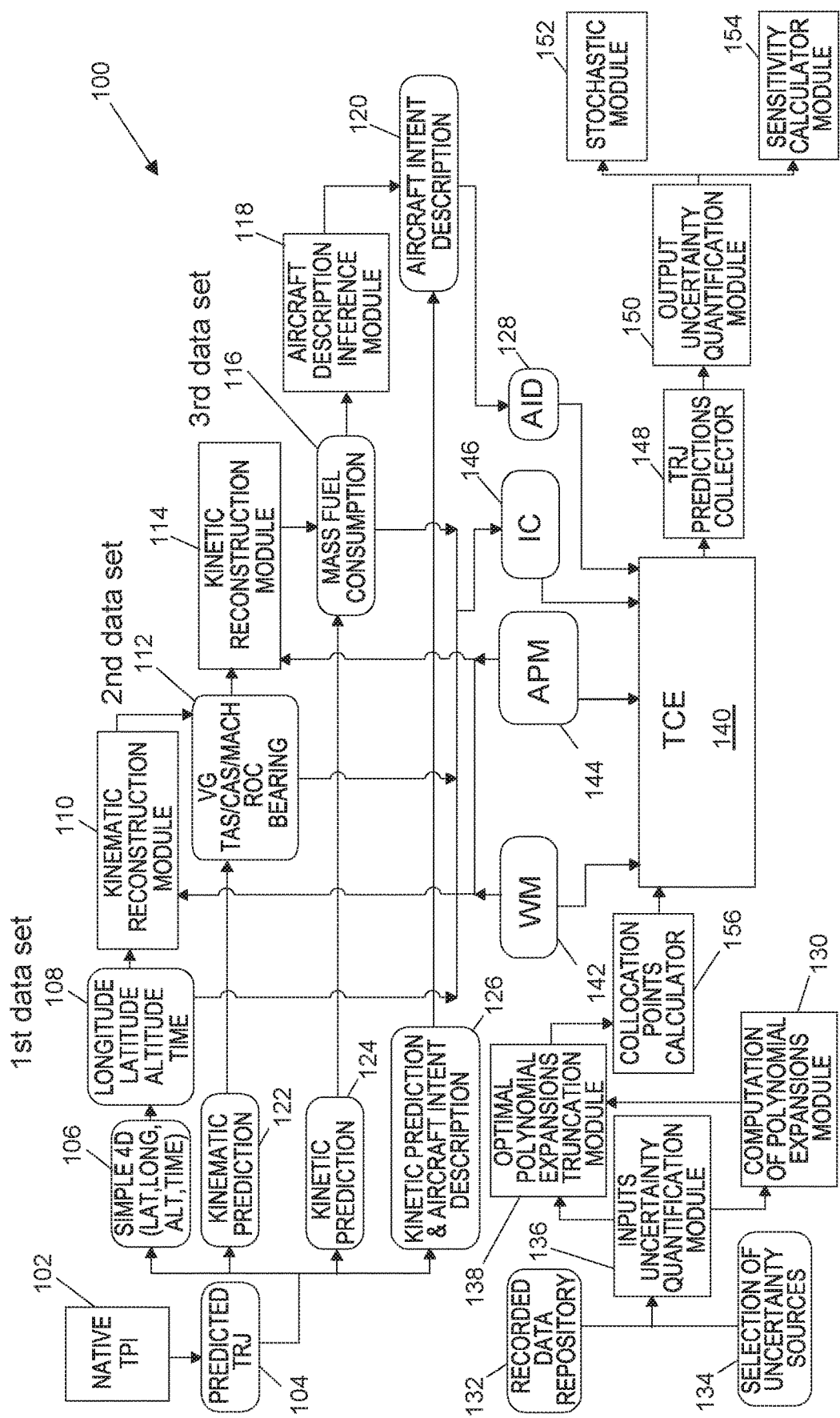
FIG. 1 schematically shows a block diagram of an architecture of a system for evaluating uncertainty in trajectory prediction according to an illustrative embodiment.

FIG. 1 shows an example of a system 100 for identifying uncertainty sources and evaluating the propagation of trajectory prediction uncertainty where square blocks represent different devices or functions that may be implemented as software applications and rounded blocks are data.

A trajectory prediction infrastructure (TPI) 102 computes a predicted trajectory 104 of one or more aircraft. The trajectory may be native. Native should be understood as the prediction computed with any Trajectory Prediction Infrastructure, regardless of the implementation and modelling used to obtain such prediction.

The trajectory prediction infrastructure 102 may provide a predicted trajectory 104 with different degree of detail.

A first stage of the process aims at performing a generation or collection of variables to characterize the propagation of uncertainties. Basically, four options can be identified according to the information available:

First Option

A trajectory prediction infrastructure 102 only provides the simplest 4-dimensional (e.g. 4D) representation 106 of the predicted trajectory 104. The 4D representation 106 includes an initial data set 108 with longitude, latitude, altitude and time of the predicted trajectory comprising a first set of data 108. Subsequent data sets will be generated based on the first set of data.

Firstly, a kinematic reconstruction module 110 reconstructs the kinematic state variables and provides a second data set 112 including kinematic information about true airspeed (TAS), calibrated airspeed (CAS), ground speed (VG), Mach number, bearing (e.g. heading (HEAD)) and rate of climb (ROC). The kinematic reconstruction module 110 makes use of a weather model (WM) 142. This WM 142 includes a forecast of the weather conditions affecting the trajectory (e.g. the wind). The kinematic reconstruction module 110 also uses an aircraft performance model (APM) 144 to check if trajectory data are in compliance with the aircraft's kinematic limitations as a procedure to detect and remove data point outliers.

Secondly, a third data set 116 including kinetic state variables information (i.e., instantaneous aircraft mass and fuel consumption) are maintained in the kinetic reconstruction module 114 with the help of the WM 142 and the aircraft performance model (APM) 144. The APM 144 includes performance information of the aircraft whose trajectory is to be predicted (e.g., drag, thrust and fuel consumption data as a function of the flight conditions).

Finally, an aircraft intent description inference module 118 provides an aircraft intent description (AID) 120 that best fits the predicted trajectory 104. Normally, the AID 120 leads to minimum trajectory computation errors with respect to the actual trajectory 104.

Second Option

The native TPI 102 provides a native trajectory prediction 104 that includes a 4D representation 106 and additionally a kinematic prediction 122 with an evolution of the kinematic state variables over time. The kinematic prediction 122 includes the information present in the second data set 112 (CAS/TAS/FG/HEAD/ROC). Thus, according to the first option, only the kinetic reconstruction module 114 and AID inference module 118 needs to be executed.

Third Option

The TPI 102 provides a native trajectory prediction 104 that includes the 4D representation 106, the kinematic prediction 122 and further a kinetic prediction 124 with an evolution of kinetic state variables with the time. The kinetic prediction 124 includes the information present in the third data set 116 (instantaneous aircraft mass and fuel consumption). Thus, only the AID inference module 118 needs to be executed.

Fourth Option

In this case, the TPI 102 provides a comprehensive trajectory prediction 104, which includes not only the 4D representation 106, the kinematic prediction 122 and the kinetic prediction 124 but also an AID 126. Consequently, no additional tasks need to be performed.

At every individual option, the dataset describing the aircraft trajectory is enhanced and enriched up to providing the most comprehensive dataset including the time evolution of all aircraft state variables (i.e., both kinematic and kinetic variables) and a formal description of the aircraft intent that univocally identify the trajectory.

Regardless of the options available in a scenario, the outcomes of the first stage are a representation of the inputs required to compute a deterministic trajectory prediction, i.e., a WM 142, an APM 144 already available and used along that stage, a set of initial conditions 146 and an AID 128. These four datasets enable the computation and reconstruction (second stage) of the original trajectory computed by the native TPI 102.

One advantage of this approach lies on decoupling different sources of uncertainty, specifically the AID 120. The proposed architecture enables a capability of modelling their random variability independently.

In a second stage, a computation of the uncertainty propagation takes place. The computation is performed assuming a set of predictions inputs: WM 142, APM 144, initial conditions 146 (IC) and AID 128 completed in the first stage.

The second stage leverages previous flight data stored in a recorded data repository 132 to assist in characterizing uncertainty associated to one or more particular sources. A selection of the sources of uncertainty module 134 is provided as user-driven process, that is, a list is provided to be considered from then on. Consequently, all remaining potential sources of uncertainty will be discarded.

Decision Support Tools (DSTs) may benefit from this approach by leveraging an enriched representation of a predicted trajectory that includes uncertainty boundaries around all aircraft state variables of interest.

It is a common situation that a user may want to reduce the number of sources of uncertainty just to those ones (e.g., identified off-line) that presumably introduce uncertainty to predicted state variables under study.

For instance, as to Demand and Capacity Balance tools, only the uncertainty of the airspace sectors entry and exit times need to be computed. Thus, the uncertainty of the atmospheric pressure could be neglected.

Inputs of the uncertainty quantification module 136 includes the available data and are used to produce a probabilistic representation of the variability of the considered inputs. This uncertainty quantification module 136 collects and structures the information required to compute the individual polynomial expansions and to enable to determine the optimal polynomial truncation. For instance, the probability density function (PDF) representing the variability of the initial aircraft mass (uncertainty source defined in the selection of uncertainty sources 134, which enables the user to select uncertainty sources to be assessed) computed from flight recorded data could be computed in this module by querying the Recorded Data Repository 132. This generated PDF function in addition to the data themselves are fed to modules 130 and 138 to obtain the truncated individual expansion that represents the uncertainty of such state variable.

The computation of polynomial expansions module 130 gathers all the algorithmic to compute the individual polynomial expansion that captures the variability of the selected inputs (i.e., state variable). The computation of polynomial expansions module 130 performs the following tasks:

Computation of the orthonormal polynomial basis required to represent the variability of the considered sources of uncertainty by polynomial expansions.

Computation of uni-variable Polynomial Expansions. For each selected source of uncertainty, a uni-variable polynomial expansion (uPE$_i$) is computed based on the data provided in an inputs uncertainty quantification module 136 and using the orthonormal polynomial basis previously obtained. This results in a statistical characterization (e.g., by PDF) of the selected sources of uncertainty.

The next optimal polynomial expansions truncation module 138 provides the order at which the polynomial expansions are to be truncated. This optimal polynomial expansions truncation module 138 computes the root mean square error (RMSE) between the inputs uncertainty quantification data and the individual polynomial expansion for every source of uncertainty. When the RMSE falls below a user-defined threshold for every expansion, the maximum among all truncation orders is returned as the overall expansion order p. To do so, both the outputs from the inputs uncertainty quantification module 136 (e.g. inputs uncertainty quantification data) and the computation of polynomial expansions module 130 (e.g. individual expansions) are required.

The next step identifies a limited list of points at which the dynamic system is to be evaluated (i.e. the Trajectory Computation Engine 140 [TCE] representing the implementation of the Aircraft Motion Model [AMM]). The collocation points calculator module 156 performs the following sub-processes:

Polynomial Roots Calculation: For each individual expansion of order p, the roots $r_i^z$ of the polynomial expansion of order p+1 is computed, where i of roots ranges from 1 to p+1, and z from 1 to n (number of individual uni-variable expansions).

Calculation of Collocation Points: The minimum number of points m at which the TCI is to be evaluated is determined by the following expression: m=(p+n)!/p!n! However, the Polynomial Roots Calculation returns a set of (p+1)$^n$ Roots Ranking: Ranking of the roots $r_i^z$ corresponding to each uni-variable expansions z according to their proximity to the mean of those data representing the uncertainty of each individual input.

Combinatory process: According to the ranked list of roots $r_i^z$, and considering all possible combinations of the roots corresponding to the polynomial expansion of each input, a subset of m combinations of the roots $r_i^z$ is built to be used afterwards to run the TCE 140 in such strategically selected points.

Once the uni-variable polynomial expansion uPE$_i$ are computed, and taking advantage of the identification of inputs of the TCE 140 (WM 142, APM 144, IC 146 and AID 128), it is possible to compute a set of m predictions that are used to obtain the multi-variable polynomial expansions (mPE$_j$) that represent the uncertainty of every aircraft state variable (st$_j$) as a function of the n expansions uPE$_i$ that represent the inputs uncertainty. The trajectory predictions collector 148 implements the combinatory that enables the construction of the multi-variable orthonormal basis of polynomials of order p by means of the n expansions uPE$_i$.

The orthonormal basis of multi-variable polynomials is required to identify the mPE$_j$. The coefficients of the mPE$_j$ that instantiate the expansions can be obtained by a fitting process between these expansions and the m computations generated by the TPI 102 previously. Suitable fitting processes can include least squares, probability distribution fitting, non-linear least-squares, etc. This fitting process is run for as many aircraft state variables as present in the predicted trajectory. This process is executed by the output uncertainty quantification module 150.

Finally, the outcomes of the global process are generated by independent modules.

Stochastic prediction module 152 provides a definition of the multi-variable expansions mPE$_j$ for each including the orthonormal basis of multi-variable polynomials. The main statistics associated to each expansion may be computed based on the knowledge of such multi-variable expansions mPE$_j$:

MEAN$_j$=a$_{0j}$ (mean value of the considered aircraft state variable st$_j$)

STD=$(\Sigma_{x=1}^n a^2_{1x})_j$ (standard deviation value of the distribution of the considered aircraft state variable st$_j$ computed by means of all coefficients of the orde-1 terms)

Sensitivity calculator module 154 provides the multivariate polynomial chaos expansion and enables the capability of computing the total Sobol indices that are used to rank the influence of the n inputs parameters on the outputs variability. It is a measure of importance for each input variable. For more information of Sobol indices, see for instance Fort et al. "Estimation of the Sobol indices in a linear functional multidimensional model." Journal of Statistical Planning and Inference 143, no. 9 (2013): 1590-1605.

This provides a mechanism to analyze the sensitivity of the prediction uncertainty to the inputs variability.

Figure 2:
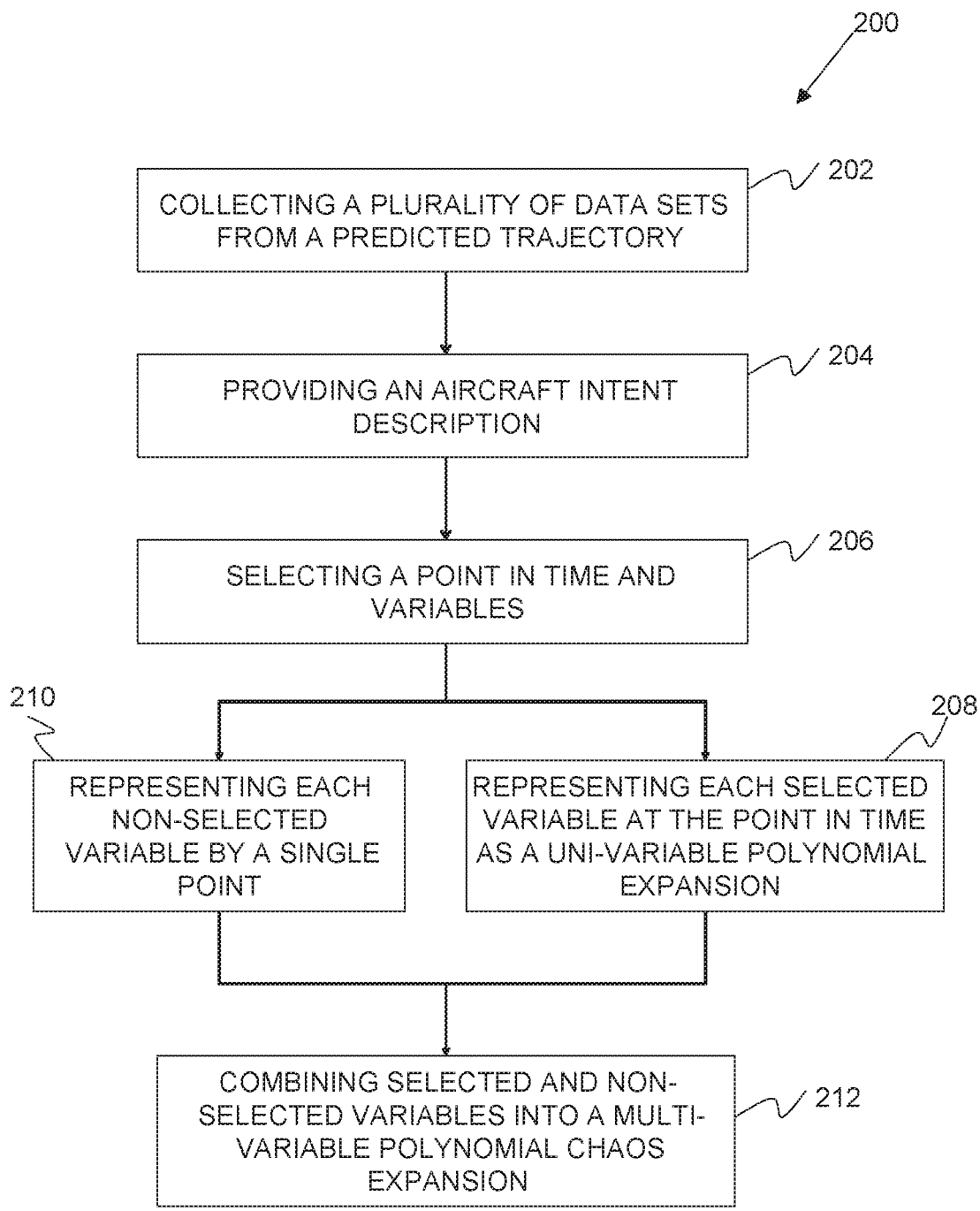
FIG. 2 is a flow chart of a method according to an illustrative embodiment.

FIG. 2 is a flow chart of a method 200 for evaluating uncertainty of a trajectory predicted infrastructure according to an illustrative embodiment. The method may be implemented as a computer-implemented method and practiced on the system 100 as described in reference to FIG. 1.

The method 200 begins with collecting a plurality of data sets from a predicted trajectory 104 module in step 202. There are three types of data sets 108, 112, 116 as indicated in FIG. 1.

Then, the method 200 goes to a step 204 for providing an aircraft intent description 120 based on inferring the predicted trajectory 104.

Afterwards, a step 206 is performed, selecting both a point in time and one or more variables among the collected data sets 108, 112, 116 as sources of uncertainty 134.

The method continues with a step 208 by representing each selected variable at the selected point in time as a uni-variable polynomial expansion and in parallel a step 210 for representing each non-selected variable by a single point.

The method 200 concludes its execution with a step 212 by combining selected and non-selected variables from the previous steps 208 and 210 into a multi-variable polynomial chaos expansion. This step 212 provides a formal representation of the prediction uncertainties of the aircraft's trajectory. The formal representation is an analytical description that may be useful to develop ATM automation tools.

Advantageously, polynomial expansions can be easily processed by computer-based CDM processes. This may be applied to exploit actual flight data or surveillance data to characterize more realistically the sources of uncertainty.

In accordance with another embodiment, a computer program product for evaluating uncertainty of a predicted trajectory infrastructure is provided. The computer program product includes a computer readable storage medium having program instructions embodied therewith. The computer readable storage medium is not a transitory medium per se. The program instructions are executable by a processor to cause the processor to perform a method described with reference to FIG. 2.

These and other features, functions, and advantages that have been discussed can be achieved independently in various embodiments or may be combined in yet other embodiments.

The invention claimed is:

1. A computer-implemented method for evaluating uncertainty of a predicted trajectory infrastructure, the method comprising:
   collecting a plurality of data sets from a predicted trajectory;
   providing an aircraft intent description based on the predicted trajectory;
   selecting both a point in time and one or more variables among the collected plurality of data sets as sources of uncertainty;
   representing each selected variable at the selected point in time as a uni-variable polynomial expansion;
   representing each non-selected variable by a single point; and
   combining the selected and non-selected variables into a multi-variable polynomial chaos expansion representing a stochastic prediction of an aircraft's trajectory at the selected point in time and a measurement of a sensitivity of the stochastic prediction to each of the selected one or more variables among the collected plurality of data sets as sources of uncertainty.

2. The method of claim 1, wherein the plurality of data sets comprises:
   a first data set;
   a second data set; and
   a third data set.

3. The method of claim 2, wherein the first data set comprises a latitude, a longitude, an altitude and time.

4. The method of claim 2, wherein the second data set comprises a rate of climb (ROC), a bearing and at least one of the following: mach number, true airspeed (TAS), calibrated airspeed (CAS), and ground speed (VG).

5. The method of claim 2, wherein the third data set comprises mass and fuel consumption.

6. The method of claim 2, wherein the second data set is generated by a kinematic reconstruction module from the first data set using a weather model and an aircraft performance model.

7. The method of claim 2, wherein the third data set is generated by a kinetic reconstruction module from the second data set using a weather model and an aircraft performance model.

8. The method of claim 1, wherein non-selected variables are represented by a median or a mean.

9. A system for evaluating uncertainty of a predicted trajectory infrastructure, the system comprising:
   a processor, the processor being configured to:
      collect a plurality of data sets from a predicted trajectory;
      provide an aircraft intent description based on the predicted trajectory;
      select both a point in time and one or more variables among the collected plurality of data sets as sources of uncertainty;
      represent each selected variable at the selected point in time as a uni-variable polynomial expansion;
      represent each non-selected variable by a single point; and
      combine the selected and non-selected variables into a multi-variable polynomial chaos expansion representing a stochastic prediction of an aircraft's trajectory at the selected point in time and a measurement of a sensitivity of the stochastic prediction to each of the selected one or more variables among the collected plurality of data sets as sources of uncertainty.

10. The system of claim 9, wherein non-selected variables are represented by a median or a mean.

11. The system of claim 9, wherein the plurality of data sets comprises:
   a first data set;
   a second data set; and
   a third data set.

12. The system of claim 11, wherein the first data set comprises a latitude, a longitude, an altitude and time.

13. The system of claim 11, wherein the second data set comprises a rate of climb (ROC), a bearing and at least one of the following: mach number, true airspeed (TAS), calibrated airspeed (CAS), and ground speed (VG).

14. The system of claim 11, wherein the third data set comprises mass and fuel consumption.

15. The system of claim 11, wherein the processor is further configured to generate the second data set from the first data set using a weather model and an aircraft performance model.

16. The system of claim 11, wherein the processor is further configured to generate the third data set from the second data set using a weather model and an aircraft performance model.

17. The system of claim 9, wherein the processor is further configured to:

compute an individual polynomial expansion that captures a variability of each selected variable; and provide an order at which each polynomial expansion is to be truncated.

18. The system of claim 9, wherein the processor is further configured to compute a set of predictions that are used to obtain the multi-variable polynomial chaos expansion that represent an uncertainty of each aircraft state variable as a function of expansions of the uni-variable polynomial expansion that represent the sources of uncertainty.

19. The system of claim 18, wherein the processor is further configured to perform a fitting process between the multi-variable polynomial expansions and a set of computations generated by the predicted trajectory infrastructure.

20. A computer program product for evaluating uncertainty of a predicted trajectory infrastructure, the computer program product comprising a non-transitory computer readable storage medium having program instructions embodied therewith, the program instructions being executable by a processor to cause the processor to perform a method comprising:

collecting a plurality of data sets from a predicted trajectory comprising:

providing an aircraft intent description based on the predicted trajectory;

selecting both a point in time and one or more variables among the collected plurality of data sets as sources of uncertainty;

representing each selected variable at the selected point in time as a uni-variable polynomial expansion;

representing each non-selected variable by a single point; and combining the selected and non-selected variables into a multi-variable polynomial chaos expansion representing a stochastic prediction of the aircraft's trajectory at the selected point in time and a measurement of a sensitivity of the stochastic prediction to each of the selected one or more variables among the collected plurality of data sets as sources of uncertainty.

* * * * *